United States Patent [19]
Adams

[11] 4,100,248
[45] Jul. 11, 1978

[54] MANUFACTURE OF GRADING AND DEWATERING SCREENS

[75] Inventor: Terence C. Adams, Exeter, England

[73] Assignee: Birtley Engineering Limited, Chesterfield, England

[21] Appl. No.: 738,979

[22] Filed: Nov. 4, 1976

[30] Foreign Application Priority Data

Nov. 4, 1975 [GB] United Kingdom ............... 45798/75
Jul. 26, 1976 [GB] United Kingdom ............... 31105/76

[51] Int. Cl.² ............................ B29D 3/02; B29H 7/22
[52] U.S. Cl. .................. 264/273; 162/DIG. 1; 249/60; 264/275; 264/DIG. 70
[58] Field of Search ............... 249/60; 264/DIG. 70, 264/273, 334, 275; 162/DIG. 1

[56] References Cited
U.S. PATENT DOCUMENTS

| 2,341,499 | 2/1944 | Cunningham | 264/334 X |
| 2,757,415 | 8/1956 | Mathues | 264/334 X |
| 3,914,368 | 10/1975 | Harkness | 264/219 |
| 3,972,974 | 8/1976 | Pico | 264/DIG. 70 |

*Primary Examiner*—Thomas P. Pavelko

*Attorney, Agent, or Firm*—Sughrue, Rothwell, Mion, Zinn and Macpeak

[57] ABSTRACT

An element for use in forming a deck for a grading or dewatering screen is formed by casting an elastomeric material such as polyurethane into a mould so that a smooth sheet of the material is formed in a liquid state in the mould, lowering into the liquid elastomeric material a substantially rigid open-work reinforcement, such as a perforated metal plate, and an array of studs for forming apertures in the screen element, the studs extending through the openings of the reinforcement and through the elastomeric material substantially to the bottom of the mould, allowing the elastomeric material to set, and then withdrawing the studs from the set sheet of elastomeric material. This provides a screen element comprising a sheet of elastomeric material having a rigid reinforcement embedded therein and a plurality of grading or dewatering apertures extending through the elastomeric sheet, the apertures being aligned with the openings in the reinforcement. Preferably the reinforcement has projections, such as flanges, extending substantially perpendicularly from it and from the rear face of the elastomeric sheet on at least two opposite edges of the element.

18 Claims, 18 Drawing Figures

MANUFACTURE OF GRADING AND DEWATERING SCREENS

Screens for grading minerals by particle size, and screens for dewatering slurries are well known, the screens comprising a suitably apertured screen deck which may be flat or curved and which, in use, may be inclined, or vibrated or both, to encourage the desired separation. In the past such screen decks have been made of metal, but because of their poor wear characteristics when abrasive minerals or slurries are being screened, it is becoming the practice to line or substitute the deck by a suitably apertured sheet of wear resistant elastomeric material such as a polyurethane. In the case of substitute screen decks, the apertured sheet of elastomeric material is preferably reinforced, and it is to a method of making an apertured reinforced elastomeric screen element for a grading or dewatering screen, and to elements produced thereby, that the present invention relates.

A method of making an apertured plastics screen containing a metal reinforcement mesh has been proposed in U.S. Pat. No. 3,914,368, in which the reinforcement mesh is located horizontally above the base of a mould and a series of pegs for forming the screen apertures are placed through the openings in the reinforcement mesh to stand on the bottom of the mould before a liquid plastics material is poured into the mould to fill the spaces around the pegs and envelop the metal mesh. The disadvantage of this method is that it is only practical for producing grading screens in which the apertures are at least 5 mms across and are correspondingly spaced from each other. The method cannot be used to produce an effective dewatering screen in which the apertures are much smaller (in some cases as little as 0.1 mm across) and much closer together. The reason for this is that when the number of pegs in the mould are increased and placed closer together as is necessary to produce a dewatering screen with adequate available screening area, it is very difficult to get the cast liquid plastics material to fill all of the spaces between the pegs and the reinforcement, and to get rid of the many air bubbles which thereby get trapped in the plastics material.

A method by which a reinforced plastics dewatering screen may be made is described in United Kingdom Patent Specification No. 1,289,537. In this method a large number of preformed elastomeric perforated plate elements, which are unreinforced and are preferably injection moulded, are placed next to each other with spaces between them in a flat mould. Reinforcement members are then located in the spaces, and the spaces are filled with a hard setting material which embeds the reinforcement and bonds the elastomeric elements together. One of the main disadvantages of this method is that, although the apertures in the individual elements may be made small and close together as a result of moulding under pressure, it is not possible to obtain reinforcement of the material around every aperture. The reinforcement members are restricted to the spaces between neighbouring elements. The method is also relatively expensive to set up and carry out.

The aim of the present invention is to provide a moulding method by which it is possible to produce simply and economically not only reinforced elastomeric screen elements having relatively large apertures for grading screens, but also similar elements having relatively small apertures for dewatering screens.

According to the invention, a method of making a reinforced elastomeric screen element for a grading or dewatering screen comprises forming a sheet of a wear resistant elastomeric material in a liquid state in a tray-like mould, lowering into contact with the liquid elastomeric material in the mould a substantially rigid openwork reinforcement and an array of studs for forming the apertures of the screen element, the studs extending through the openings of the reinforcement and through the liquid elastomeric material substantially to the bottom of the mould, allowing the elastomeric material to set, and withdrawing the studs from the set sheet of elastomeric material in the mould leaving the reinforcement permanently fixed to the elastomeric material.

With the method in accordance with the invention, the liquid elastomeric material is cast into a clear horizontal mould and allowed to find its own level. Any air bubbles in the material will tend to rise to the surface, assisted by vibration of the mould if desired, and if necessary, the surface of the liquid material in the mould may be treated, such as by means of a flame briefly directed onto the surface, to remove any surface bubbles before the reinforcement and the studs are lowered into the material. Consequently, the reinforcement and the studs are lowered into a smooth bubble free sheet of liquid material in the mould, and it has been found that, rather surprisingly, there is then no real problem with air entrapment beneath the reinforcement, even when there are a large number of closely spaced small studs and there is a relatively small clearance between the studs and the edges of the reinforcement openings through which the studs project.

Preferably the reinforcement and the studs are lowered into contact with the liquid elastomeric material together, the studs being supported by the reinforcement and extending through the openings of the reinforcement. There should of course be some clearance between the studs and the edges of the reinforcement openings to allow the escape of air from below the reinforcement and also to allow elastomeric material to enter the reinforcement openings around the studs.

It is in fact preferred that the elastomeric material should pass right through the openings so that the reinforcement is enveloped and thereby embedded in the apertured elastomeric sheet which is produced. In this case, when the studs are tapered towards the bottom of the mould as is preferred, the studs may be supported by the reinforcement by contact with the edges of the reinforcement openings at spaced points around the peripheries of the studs, and the reinforcement is preferably moved further into the mould relative to the studs after the studs have penetrated to the bottom of the mould. This further movement of the reinforcement forces the elastomeric material upwards through the clearance between the studs and the openings to envelop the reinforcement, and also disengages the studs from the edges of the reinforcement openings so that the whole surface of each reinforcement opening is covered by the elastomeric material.

The reinforcement need be embedded to a depth of only 1 to 3 mms. from the upper surface of the elastomeric material, whereas the thickness of the elastomeric material between the reinforcement and the lower surface of the material, which in use forms the working face of the screen element, will usually be from 4 to 10 mms for dewatering screen elements and from 6 to 20 mms for larger aperture screens such as grading screens. By having the reinforcement embedded in the elastomeric material, the two are bonded together simply and securely. Also, corrosion of the reinforcement, which usually will be made of steel, is substantially prevented, although it may often be preferred that the reinforcement is first provided with a corrosion resistant coating, which may also promote bonding of the elastomeric material to the reinforcement.

Preferably the method is carried out with each stud extending through a different opening in the reinforcement, so that the elastomeric material around each aperture of the resulting screen element is reinforced. The reinforcement is preferably made of metal, for example steel, and may be in the form of a mesh, grid or other arrangement of strips or rods forming openings. Preferably however, the reinforcement is a perforated metal plate.

It is obvious that the arrangement of the studs and the reinforcement which are lowered into the liquid elastomeric material will determine the pattern of the apertures which are produced in the set sheet, but unless the studs have abutted the bottom of the mould the apertures will not extend right through the sheet and it will be necessary to remove some flashing or even a thin uniform layer of material from the face of the sheet which lay against the bottom of the mould, i.e. the working face, before the screen element is ready for use. This necessity may however be avoided by providing the base of the mould with a thin (of the order of 1mm thick) and uniform layer of waxy material before the sheet of liquid elastomeric material is formed in the mould, the waxy coating on the base of the mould remaining solid at the temperature at which the liquid elastomeric material is cast and cured in the mould. With this arrangement it is not vital that the ends of the studs abut the bottom of the mould so long as they touch or penetrate into the waxy coating, although in the case of tapering studs variations in the depth of penetration will affect the size of the aperture formed at the working face.

It will also be clear that the shape of the studs will determine the profile of the apertures produced in the screen element, and consequently any desired aperture profile may be obtained provided it allows the studs to be stripped from the set elastomeric sheet without the studs or the sheet being damaged. Usually however, this will present no problems since the apertures in grading or dewatering screen elements preferably gradually widen from the working face of the element, and such profiles are achieved by using studs which taper towards the bottom of the mould and which are therefore easy to strip from the sheet.

If the screen element to be made is intended for use in a dewatering screen, the studs are preferably shaped to produce apertures in the form of narrow slots (for example between 0.1 and 1 mm wide at the working face of the screen element and about 20 mms long), and the openings of the reinforcement must be arranged accordingly. In this case it is convenient for the studs to project from a series of parallel blades extending in the longitudinal direction of the slot apertures produced in the screen element, each blade carrying a longitudinal row of studs, rather like a wide toothed comb. The blades may be bolted, or otherwise clamped, either in groups or altogether, and if necessary with suitable spacers between them at their upper ends. Alternatively, the blades may remain separate from each other but will nevertheless have some means of supporting them laterally at their upper ends, such as spacers which fit on and between the blades, in order to maintain the blades substantially parallel with each other so that the studs project vertically through the reinforcement. With this arrangement, it is possible to remove blades individually in the event of certain studs sticking in the set material, although it will be normal practice for the blades to be removed in groups, if not all at once.

Of course, the studs need not be arranged on a series of blades. If preferred, the studs may all be separate from each other, although it will usually be more convenient to have them arranged in groups attached, permanently or otherwise, to a suitable carrier member. For example, several rows of studs may be machined from a single solid block of a suitable material, such as steel.

When the studs are stripped from the set sheet of elastomeric material in the mould, the reinforcement will hold the sheet substantially horizontal in the mould, thereby assisting the stripping process and helping to prevent possible damage to the studs or the sheet. However, because elastomeric materials such as polyurethane shrink considerably on setting and cooling, the material will tend to grip the studs rather tightly perhaps even causing them to bend slightly, at their lower ends where the material is furthest from the restraining influence of the reinforcement, which could make the stripping process difficult when cold. The process may therefore be facilitated by withdrawing the studs after the elastomeric material has set but while it is nevertheless still hot. In this way the material has not fully shrunk and therefore does not grip the studs quite so tightly. It may even be advantageous to heat the set elastomeric material before the studs are withdrawn to a temperature between 10° and 20° C higher than the temperature at which the material set. Furthermore, the studs may obviously be coated with a suitable release agent. Equally, if there is likely to be any tendency for the elastomeric material to stick to the mould itself, the inside of the mould may also be coated with a suitable release agent.

As just mentioned, the shrinkage of certain elastomeric materials such as polyurethane as it cures and cools can be a problem, not only in respect of stripping the studs from the material but also by causing warping of the resulting screen element. The extent of the problem increases with the size of the element being formed, and it is therefore preferred to make the elements with a size of the order of 30 cms square. Because of the rigid reinforcement substantially resisting the shrinkage throughout the element, especially in and near the plane of the reinforcement, this size is nevertheless much larger than is practical by other moulding methods, such as the injection moulding of the unreinforced elements (approximately 10 cms. square) used in the method of United Kingdom Specification No. 1,289,537. Relatively large screen decks would then be formed by fixing together side by side the requisite number of smaller screen elements made in accordance with the invention.

Besides avoiding the problem of shrinkage, this arrangement is very convenient in that the apparatus needed for carrying out the method is kept relatively compact and easy to handle, and large numbers of moulds for different size screen decks are not necessary. Also, slight differences in the aperture size obtained in the screen elements can be achieved using a single set of tapered studs, simply by increasing or decreasing the thickness of the wax layer which is preferably applied to the base of the mould before the elastomeric material is cast.

For the purpose of fixing together screen elements made in accordance with the invention, the elements are each preferably moulded using reinforcement which has projections extending substantially perpendicularly from it and from the exposed face of the elastomeric material in the mould adjacent at least two opposite edges of the mould so that the projections lie on the corresponding edges of the resulting element. If the screen element being formed is rectangular and is intended to form part of a larger flat screen deck preferably there are such projections adjacent all four edges of the element, but if the element is intended to form part of a cylindrical or frusto-conical screen deck, such as for a vibrating screen centrifuge, the projections are preferably provided on only the axially extending edges of the element.

The projections will enable the resultant screen element to be fixed firmly, such as by bolting, but preferably by riveting, either to a neighbouring element or to a spacer strip between the elements. In the latter case, the spacer strips will generally run along those joints which extend in the direction of the length of the screen deck, i.e. in the direction of movement of the material which is screened, and sometimes also along the transverse joints. The spacer strips may be inverted lengths of steel channel, about 1 inch by 1 inch, having a number of holes through which bolts or the like may be located for fixing the assembled screen deck (formed from the connected elements) to a screen frame. The spacer strips may be covered by a strip of elastomeric material, preferably polyurethane, to provide similar wear characteristics to the adjacent screen element.

Besides providing a convenient way of fixing neighbouring elements together, the projections on the reinforcement provide the individual screen elements and also the resulting composite screen deck with additional strength and rigidity, particularly when the projections are in the form of flanges. If however this is still considered insufficient for a particular application, further reinforcement, for example in the form of steel rods or lengths of rolled steel sections may be suitably fixed to the projections so that they extend between adjacent elements and/or across the elements.

A further advantage of using reinforcement with such projections in the method in accordance with the invention is that the projections may be used to support the reinforcement in a predetermined position relative to the mould while the elastomeric material sets, such as by means of clamps which grip the projections and are arranged to rest on the mould walls. Since the projections are, of necessity, at the edges of the resulting element, they produce a simple way of supporting the reinforcement in the mould without hindering the withdrawal of the studs from the set elastomeric sheet. In fact, if necessary the reinforcement and the set elastomeric material may be held steady in the mould while the studs are withdrawn, by bearing down on the reinforcement, although they may be welded or otherwise fixed to it if desired. The latter arrangement may be preferred when, because of the large number of small and closely spaced openings required in the reinforcement, the gauge of material which may be used to form the reinforcement will be insufficient to provide the required strength and rigidity so that additional strengthening members will have to be provided as mentioned earlier. In this case the projections which are welded to the edges of the reinforcement may be chosen to provide the required strength and rigidity.

The method in accordance with the invention provides a way of making either grading or dewatering screen elements in a manner which is simple and relatively inexpensive to set up and operate. Furthermore, the screen elements which can be produced by the method are of very high quality. For example, by having the reinforcement surrounding each and every aperture of the element there is no tendency for some apertures to open up excessively during operation and thereby allow oversize particles to pass through or to jam wide the aperture while adjacent apertures are squashed closed, thus causing very inefficient screening. Also, the effect of the reinforcement in restricting the shrinkage of the polyurethane (when this is used as the elastomeric material) leaves the polyurethane in a state of tension, (and the reinforcement in compression). Polyurethane screen elements with no or only occasionally spaced reinforcement will tend to suffer permanent set, and sag, after weeks or months of use, especially in vibrating screens. Once screen elements sag they no longer hold their apertures accurately, and fail to transmit properly the vibration required for efficient screening. The extensive local steel reinforcement of the present element will not only arrest this tendency to sag, but by starting off in a state of natural tension the polyurethane will not suffer sagging to the same extent or as soon as in less locally reinforced screen elements. Finally, because the extensive reinforcement enables the screen elements to be made larger than less well reinforced or unreinforced elements, the screen decks which are made have a much greater total available screening area since there are correspondingly less "dead" strips (having no apertures) where the elements are joined. These strips are often relatively wide in the case of previous elements since they are usually provided with additional reinforcement rods or wires.

An example of a method in accordance with the invention will now be described with reference to the accompanying drawings, in which:

FIG. 13 is a perspective view of a screen element formed by the method illustrated in the preceding Figures;

FIG. 14 is a cross-section taken on the line XIV—XIV in FIG. 13;

FIG. 15 is a cross-section taken on the line XV—XV in FIG. 13;

FIG. 16 is a schematic view of a screen deck formed from a number of the screen elements shown in FIG. 13;

Figure 1:
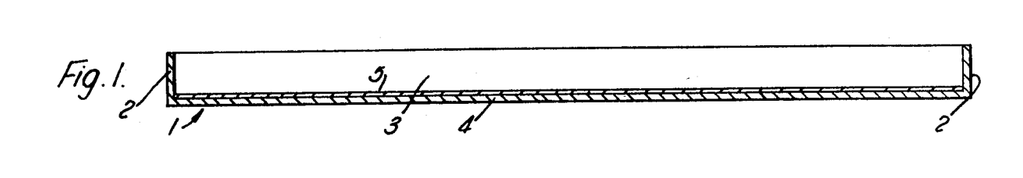
FIGS. 1 to 4 are cross sections through a rectangular open topped mould illustrating different stages in the method which is for making a dewatering screen element.

FIG. 1 shows a rectangular open topped tray like steel mould 1 having vertical sides and end walls 2 and 3 respectively and a flat horizontal bottom 4. The inner surfaces of the mould 1 are conditioned with a suitable release agent, such as a silicone emulsion, for preventing the surfaces of the steel mould 1 from sticking to polyurethane, which is the elastomeric material from which the screen element is to be made. The mould 1 is heated and a small amount of a silica grease is melted in the mould so that a thin and even layer, about 1 mm thick, of the grease is formed over the bottom 4 of the mould. The layer of melted grease is then allowed to cool until the grease solidifies to form a firm waxy layer 5 on the bottom 4 of the mould. The melting temperature of the silica grease should be about 180° C, i.e. well above the temperatures at which the rest of the method will be carried out, in order that the grease layer 5 remains solid throughout the rest of the method.

Figure 2:
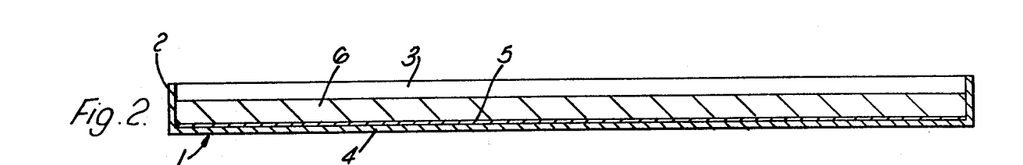
Figure 3:
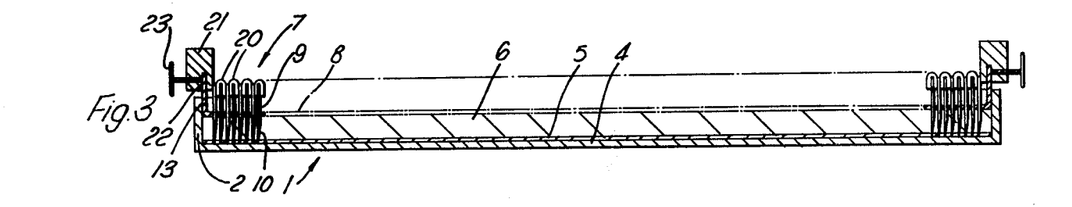

While the mould 1 is still hot, at about 110° C, a predetermined amount of liquid uncured polyurethane is poured into the mould and allowed to form a flat uniformly thick liquid sheet 6 over the solid grease layer 5. Any bubbles in the liquid polyurethane sheet 6 will tend to rise to the surface, and if necessary the surface is flame treated to remove the bubbles and render it absolutely smooth for the next stage in which an assembly 7, comprising a perforated steel reinforcement plate 8 carrying a number of blades 9 having studs 10 projecting through the perforations in the plate 8, is lowered into the mould 1 as shown in FIG. 3.

Figure 5:
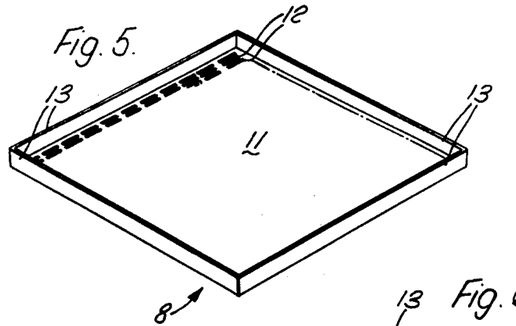
FIG. 5 is a perspective view of the reinforcement which is used in the method shown in FIGS. 1 to 4.

The construction of the reinforcement plate 8 is shown in more detail in FIG. 5. The steel reinforcement plate 8 comprises a flat rectangular perforated central portion 11 in which the perforations are in the form of slots 12 arranged in parallel rows as shown. Each slot 12 is 20 mms long by 1.6 mms wide and has rounded ends as can be seen more clearly from FIGS. 10 and 12. The spacing between adjacent slots is 4 mms end to end and 1.9 mms side to side. It will of course be appreciated that these dimensions are dependent upon the screen element which is to be made. Along each edge of the rectangular central portion 11 the reinforcement plate 8 has an unperforated flange 13 which projects upwardly at right angles to the central portion. The flanges 13 are welded together at the corners of the central portion 11 so that the reinforcement plate 8 has a substantially rigid upturned box lid construction, the dimensions of which are such that it just fits into the mould 1.

Figure 6:
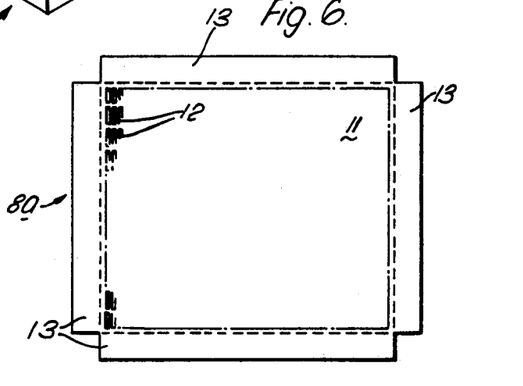
FIG. 6 is a plan view of a metal plate from which the reinforcement of FIG. 5 is formed.

The reinforcement plate 8 is made from a flat sheet 8a of 16 gauge steel which is cut to size in the shape shown in FIG. 6. The central portion 11 of the sheet 8a within the dotted lines is then punched from above to produce the slot perforations 12 of the reinforcement plate, following which the peripheral portions 13 of the sheet 8a outside the dotted lines are bent upwards at right angles to the central portion 11 to form the flanges. These flanges 13 are then welded together at their ends, i.e. at the corners of the portion 11. The reinforcement plate 8 so formed is then degreased and shot blasted, particularly underneath, to prepare its surfaces for bonding to polyurethane. The flanges 13 may be coated with a thin film of polyurethane by a hot dip process, or alternatively they may be brushed or sprayed with a different anti-corrosion agent. If preferred however, the whole reinforcement plate 8 may be coated, in which case the anti-corrosion agent may also be a bonding agent, such as can be obtained under the brand name Thixon AB1153, and provided the slots 12 would not become blinded, the coating is preferably applied by a dip process.

Figure 7:
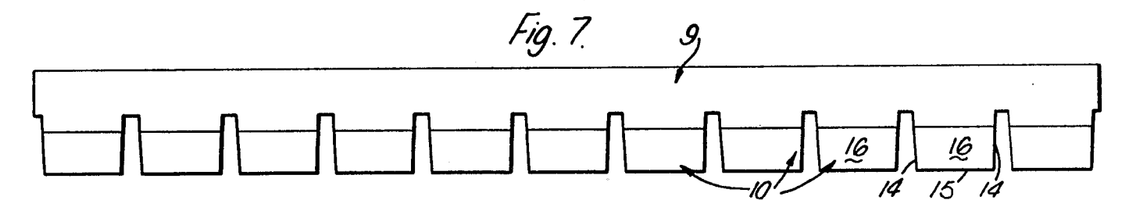
FIG. 7 is a side elevation of blade carrying a number of aperture forming studs as used in the method shown in FIGS. 1 to 4.
Figures 8, 9:
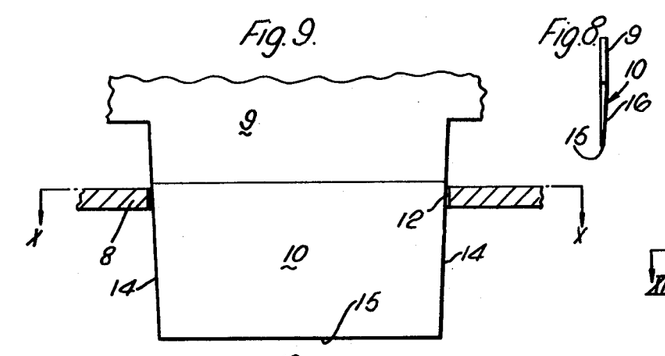
Figure 10:
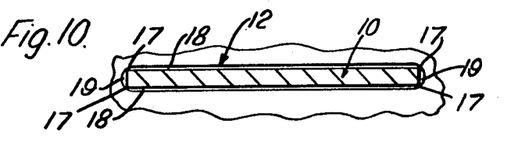

The construction of the stud blades 9 is illustrated in FIGS. 7 and 8, each blade 9 having a length slightly less than the distance between the opposite flanges 13 of the reinforcement plate 8 in the direction of the slots 12, and carrying the same number of downwardly projecting studs 10 as there are slots 12 in a longitudinal row. The blade 9 is made from 18 gauge steel strip, and the studs 10 are formed by notching out the spaces between them. As can be seen, the opposite ends 14 of each stud 10 taper slightly towards the lower edge 15. Each stud 10 is also provided with a tapered profile as shown in FIG. 8 by grinding one side 16 of the blade 9 adjacent the lower edges of the studs. The dimensions and spacing of the studs 10 of each blade 9 are such that the blade 9 will fit on the reinforcement plate 8 with the studs 10 projecting through the slots 12 in one complete row, each stud fitting through its slot 12 as shown in FIGS. 9 and 10. As can be seen, the stud 10 contacts the edge of the slot 12 only at the corners 17 of the stud cross-section so that there are clearance gaps 18 and 19 at the sides and ends of the studs 10.

The assembly 7 has a blade 9 for each row of slots 12 in the reinforcement plate 8 so that every slot 12 has a stud 10 projecting through it. This means that in the present example there are between eighty and ninety blades in the assembly. The studs 10 of each blade 9 are coated with a release agent before being positioned in the reinforcement plate 8. When in position the blades 9 are held relatively steady and parallel to each other by means of spacer clips 20 which are fitted over the upper edges of alternate blades 9, each spacer clip 20 being formed by a U-shaped strip of 13 gauge metal (preferably aluminium).

The assembly 7 further comprises a pair of support clamps 21 mounted on the opposite flanges 13 of the reinforcement plate 8 parallel to the blades 9. Each support clamp 21 comprises a bar having a groove 22 along its under surface into which the upper edge of the flange 13 fits, and a number of clamping screws 23 which are arranged to be screwed laterally through the bar into the groove 22 and against the outer face of the flange 13. The positions of the support clamps 21 on the flanges 13 are adjusted and tightened so that the lower surface of the bar is parallel to the perforated central section 11 of the reinforcement plate 8 and spaced therefrom by a predetermined amount. The clamps 21 also act as "book-ends" for the blades 9, keeping them upright without interfering with their placement on the plate 8 or their subsequent removal.

When the assembly 7 is complete, it is heated to about 110° C, which is slightly above the temperature of the liquid sheet of polyurethane 6 in the mould 1, i.e. about 100° C, and is then lowered carefully into the mould until the position shown in FIG. 3 is reached. At this stage the lower ends 15 of the studs 10 penetrate into the waxy layer 5 on the bottom 4 of the mould and the undersurface of the perforated section 11 of the reinforcement plate 8 is in contact with the upper surface of the liquid polyurethane sheet 6 so that the polyurethane just fills the clearance gaps 18 and 19 between each stud 10 and its surrounding slot 12 in the reinforcement plate 8.

Figure 4:
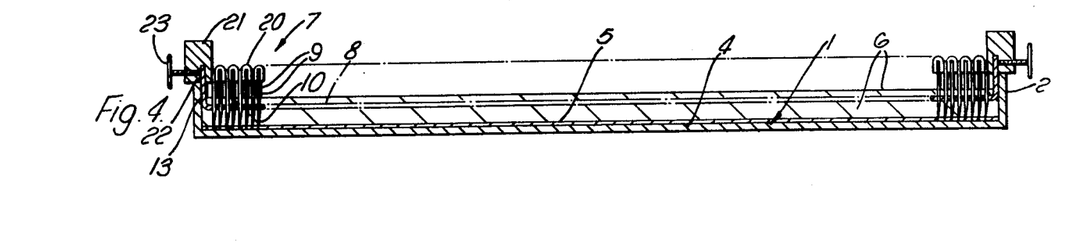
Figure 11:
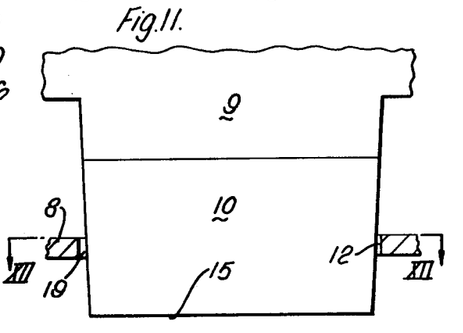
FIG. 11 is a view similar to FIG. 9 but showing the relative positions of the stud and the reinforcement slot at the stage illustrated in FIG. 4.
Figure 12:
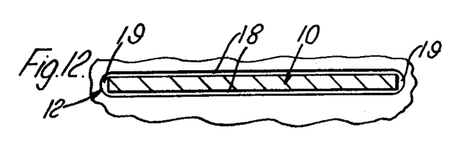
FIG. 12 is a cross-section taken on the line XII—XII in FIG. 11.

The reinforcement plate 8 is then forced further down into the mould 1 by pressing downwards on the support clamps 21 until the lower surface of each support clamp bar 21 engages the upper edge of the side walls 2 of the mould as shown in FIG. 4. In moving the reinforcement plate 8 to this position, the liquid polyurethane is forced upwards through the slots 12 around the studs 10 to envelop completely the perforated central section 11 of the reinforcement plate 8. Because of the tapering profile of the studs 10, the downward movement of the plate 8 relative to the studs increases the clearance gaps 18 and 19 between the studs 10 and the slot 12 as shown in FIGS. 11 and 12. This facilitates the upward flow of polyurethane through the slots 12 and also means that there is no longer any contact between the studs and the reinforcement plate.

If desired, the blades 9 may be vibrated at this stage to ensure that the studs 10 are located centrally in the slots 12 as shown in FIG. 12. This vibration may be effected simply by rubbing a suitable device across the top of the blades 9. The spacer clips 20 are preferably dimensioned so as to permit a very slight degree of lateral rocking of the blades 9 relative to each other, and the rocking and vibration, besides centering the studs 10 in the slots 12 also assists the liquid polyurethane to find its own level above the central section 11 of the reinforcement plate 8 and ensures that all the clearance spaces 18 and 19 are completely filled.

The polyurethane 6 is then left to set in the mould 1 with the assembly 7 in the position of FIG. 4, and after from 10 to 30 minutes (depending on the grade of polyurethane) the blades 9 can be removed from the set polyurethane and the embedded reinforcement plate 8. The blades are removed by first lifting one end by about 5 to 10 mms and then levering up the other end before lifting the blade completely clear of the mould. The blades may be lifted up in groups of ten or more but if any difficulty is encountered due to the studs of one or more blades sticking in the set polyurethane sheet, these blades may be removed individually to avoid possible damage to the set polyurethane sheet or to the blades.

Following removal of the blades 9 the polyurethane sheet 6 and the embedded reinforcement plate 8 is left in the mould until the full heat curing of the polyurethane is complete, in from 1 to 2 hours. The set sheet is then lifted from the mould by means of the clamps 21 on the flanges 13, and after removal of the clamps 21 and of any flashing around the apertures produced by the studs 10 in the working face of the sheet 6, i.e. the face which was lowermost in the mould 1, a screen element 24 as shown in FIGS. 13 to 15 is obtained.

In this particular method, the element 24 formed is approximately 30 cms square and is intended for use in a dewatering screen deck. The screen element 24 comprises the set sheet 6 of polyurethane with the steel reinforcement plate 8 embedded to a depth of from 1 to 3 mms from the upper surface of the sheet 6 and with the flanges 13 of the plate projecting perpendicularly from the upper surface along the edges of the sheet. The sheet 6 has an overall thickness of about 10 mms and contains a large number (approximately 1000) of slot-like apertures 25 which have been formed by the studs 10 and therefore have profiles corresponding to those of the studs. Consequently, the apertures 25 extend through the slots 12 in the reinforcement plate 8 and taper as shown in FIGS. 14 and 15 so that their narrowest end is located in the lower face, i.e. the working face, of the sheet 6. The size of each aperture is approximately 18.5 mms by 0.3mm in the working face, and 19.5 mms by 1.2 mms in the upper face of the sheet 6. The polyurethane used has a hardness which is between 85° and 90° Shore A.

Figures 13, 14, 15, 16, 18:
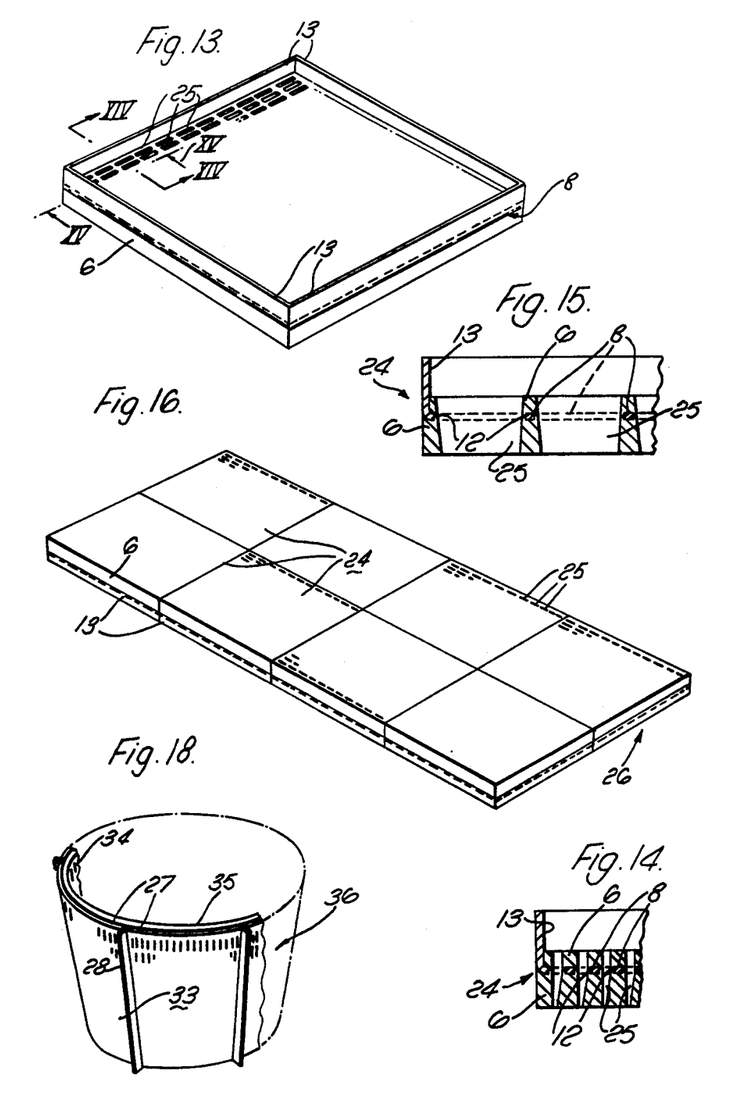

FIG. 16 shows a schematic view of a relatively small flat dewatering screen deck 26 (with its working face uppermost) formed by fixing together eight identical screen elements 24. The elements 24 are fixed together by riveting the abutting flanges 13 of adjacent elements 24 together, although other fixing methods such as bolting or welding may be used if preferred. Screen decks of this size may be assembled in the factory, whereas it would probably be more practical to assemble larger screen decks on site, either from individual elements 24 or from a number of sub-assemblies similar to the deck shown in FIG. 16.

Figure 17:
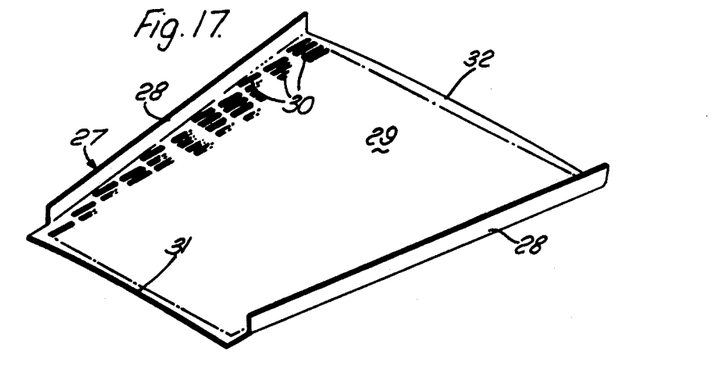
FIG. 17 is a view similar to FIG. 5 but showing a form of reinforcement for use in making a different shaped screen element; and, FIG. 18 is a schematic perspective view illustrating part of a vibrating centrifuge screen formed from a number of screen elements made using the reinforcement shown in FIG. 17.

Although the present method has been described for the formation of rectangular screen elements for flat screen decks, the method may also be used to make screen elements for forming curved screen decks such as frusto-conical screen decks, as partially illustrated in FIG. 18, for vibrating screen centrifuges. In this case the method is basically the same as already described but the shape of the reinforcement and of the mould will of course be different. A suitably shaped reinforcement plate 27 is shown in FIG. 17, having flanges 28 only along its two longitudinally extending edges. These edges are slightly divergent and the flat portion 29 between them is perforated with a number of longitudinally extending slots 30. The end edges 31 and 32 of the plate 27 are slightly curved as shown. These edges 31 and 32 form the top and bottom edges of the screen element which is subsequently formed and will become substantially horizontal when the element is curved about its longitudinal axis to fit a number of similar elements 33 together in a circle as shown in FIG. 18. The elements 33 have slot like apertures 34 through the sheet polyurethane 35 in which the reinforcement plate 27 is embedded, and are fixed together by means of the outwardly projecting side flanges 28. If the frusto-conical screen assembly 36 so formed is to include an additional circumferential row (not shown) of elements 33, it will also be necessary to make use of the flanges 28 to attach means for fixing neighbouring upper and lower elements 33 together. If the flanged reinforcement plate 27 is insufficient to give the screen elements 33 and the assembled frusto-conical screen deck 36 the required strength, additional reinforcing members (not shown) such as hoops, rings, struts or flanges, may be suitably fixed to the flanges 28 at the rear of the elements 33 when the screen deck 36 is assembled.

I claim:

1. A method of making a reinforced elastomeric apertured screen element for a grading or dewatering screen, comprising the steps of providing a tray-like mould having a substantially horizontal bottom and upright side walls, forming in said mould a sheet of a wear resistant elastomeric material in a liquid state, providing above said mould both a plurality of studs for forming the apertures of the screen element and a substantially rigid open-work reinforcement defining a plurality of openings therein, lowering said reinforcement into contact with said liquid elastomeric material in said mould, lowering said studs whereby said studs penetrate said liquid elastomeric material substantially to said bottom of said mould, said studs extending through said openings of said reinforcement, allowing said liquid elastomeric material to set, and withdrawing said studs from the set sheet of said elastomeric material in said mould leaving said reinforcement and said elastomeric material permanently fixed together.

2. A method as claimed in claim 1, wherein said reinforcement is completely enveloped in said liquid elastomeric material whereby said reinforcement is embedded in said set elastomeric sheet.

3. A method as claimed in claim 1, wherein said studs are each tapered towards said bottom of said mould.

4. A method as claimed in claim 1, wherein said studs and said reinforcement are provided above said mould with said studs being supported by said reinforcement and extending through said openings of said reinforcement, and wherein said reinforcement and said studs are simultaneously lowered into contact with said liquid elastomeric material in said mould.

5. A method as claimed in claim 4, wherein said studs are each tapered towards said bottom of said mould and are supported by said reinforcement by contact with the edges of said openings of said reinforcement at spaced points around the peripheries of said studs, and wherein the method includes the further step of moving said reinforcement further into said mould relative to said studs after said studs have penetrated to said bottom of said mould whereby said studs disengage from said edges of said reinforcement openings and said liquid elastomeric material envelopes said reinforcement.

6. A method as claimed in claim 1 wherein said reinforcement is in the form of a perforated metal plate.

7. A method as claimed in claim 1, wherein said reinforcement is provided with projections extending substantially perpendicularly from said reinforcement and from the exposed face of said elastomeric material in said mould adjacent at least two opposite side walls of said mould, and wherein the method includes the step of holding said reinforcement in a predetermined position relative to said mould while said elastomeric material sets by means engaging said projections.

8. A method as claimed in claim 7, wherein said mould is substantially rectangular and said reinforcement has projections adjacent all four side walls of said mould.

9. A method as claimed in claim 8, wherein said reinforcement is in the form of a perforated metal plate, and wherein said projections are provided by flanges formed integrally from said reinforcement plate, each of said flanges extending along substantially the whole length of the corresponding edge of said reinforcement plate.

10. A method as claimed in claim 1, wherein said studs are shaped to produce apertures in said elastomeric sheet in the form of narrow slots.

11. A method as claimed in claim 10, wherein said slots produced by said studs are between 0.1 and 1.0 mms wide at the face of said sheet adjacent said bottom of said mould.

12. A method as claimed in claim 10, wherein said studs project from a plurality of parallel blades extending in the longitudinal direction of said studs, each of said blades carrying a longitudinal row of said studs.

13. A method as claimed in claim 1, wherein each of said studs penetrates into said elastomeric material in said mould through a different one of said openings in said reinforcement.

14. A method as claimed in claim 1, including the step of coating said studs and the inside of said mould with a release agent which inhibits bonding of said elastomeric material to said studs and said mould.

15. A method as claimed in claim 1, including the step of forming a thin and even layer of waxy material over said bottom of said mould before said sheet of liquid elastomeric material is formed in said mould, said waxy material being solid at the temperature at which said liquid elastomeric material is cast in said mould.

16. A method as claimed in claim 1, wherein said studs are withdrawn from said set sheet of elastomeric material in said mould while said elastomeric material is hot.

17. A method as claimed in claim 16, wherein, before said studs are withdrawn, said set sheet of elastomeric material is heated to between 10° and 20° C higher than the temperature at which said elastomeric material set.

18. A method as claimed in claim 1, wherein said elastomeric material is a polyurethane.

* * * * *

UNITED STATES PATENT AND TRADEMARK OFFICE
CERTIFICATE OF CORRECTION

PATENT NO. : 4,100,248
DATED : July 11, 1978
INVENTOR(S) : Terence C. Adams

It is certified that error appears in the above-identified patent and that said Letters Patent are hereby corrected as shown below:

[73] Assignee: Birtley Engineering Limited, Chesterfield, England, a part interest Signed and Sealed this Fifteenth Day of May 1979

[SEAL]

Attest:

RUTH C. MASON
Attesting Officer

DONALD W. BANNER
Commissioner of Patents and Trademarks